United States Patent [19]
Dmitrowsky

[11] 4,253,625
[45] Mar. 3, 1981

[54] AIRCRAFT ATTACHABLE TO THE BODY OF A PILOT

[76] Inventor: Igor Dmitrowsky, 92-36 54th Ave., Elmhurst, N.Y. 11373

[21] Appl. No.: 74,001

[22] Filed: Sep. 10, 1979

[51] Int. Cl.³ .............................................. B69C 39/00
[52] U.S. Cl. .................................................... 244/4 A
[58] Field of Search ....................... 244/4 A, 16, 52, 64, 244/83 F

[56] References Cited

U.S. PATENT DOCUMENTS

| | | | |
|---|---|---|---|
| 1,506,624 | 8/1924 | Forchione | 244/64 X |
| 1,845,913 | 2/1932 | Goodman | 244/64 |
| 2,537,487 | 1/1951 | Stone | 244/52 |
| 2,762,584 | 9/1956 | Price | 244/52 X |
| 3,173,629 | 3/1965 | Uhor | 244/4 A |
| 3,580,636 | 5/1971 | Setto | 244/83 F |
| 3,810,985 | 4/1974 | Bilder | 244/4 A |
| 3,964,697 | 6/1976 | Mays | 244/64 |

Primary Examiner—Barry L. Kelmachter
Attorney, Agent, or Firm—Nicholas J. Garofalo

[57] ABSTRACT

A single winged aircraft adapted to be attached to the back of a pilot, including a jet fuel engine whereby it may be propelled into space and sustained in flight, and provided with manually operable controls for controlling operation of ailerons and the directional issuance of the jet stream exhausting from the engine, whereby the aircraft may be directionally controlled in flight by the pilot.

3 Claims, 16 Drawing Figures

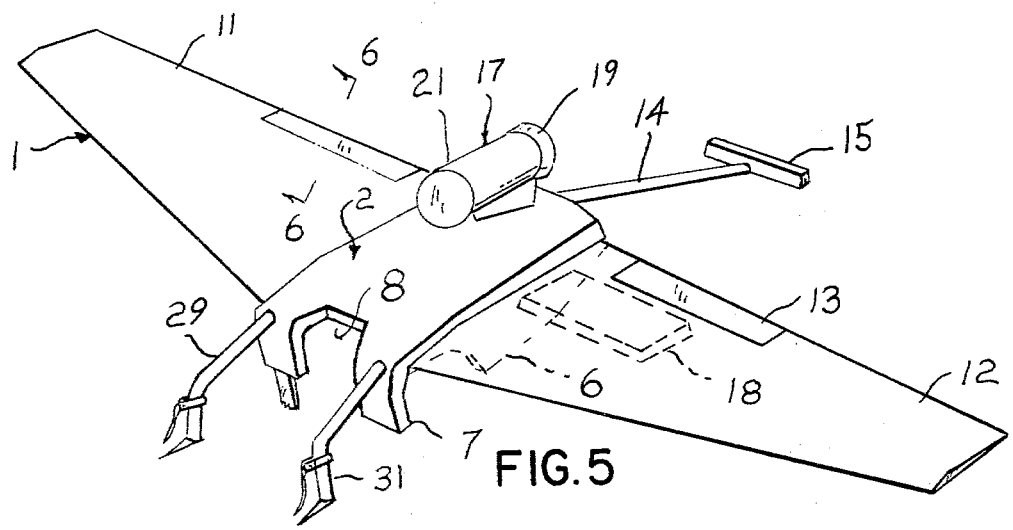
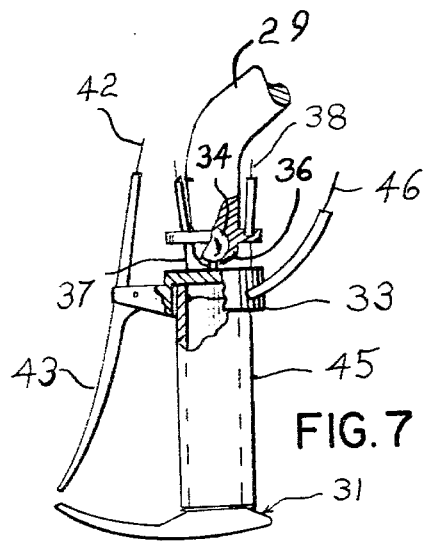
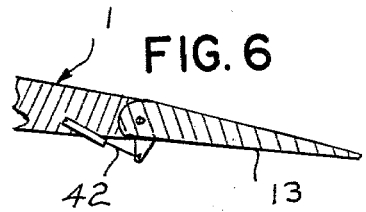
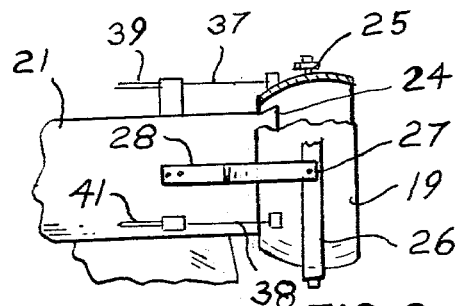
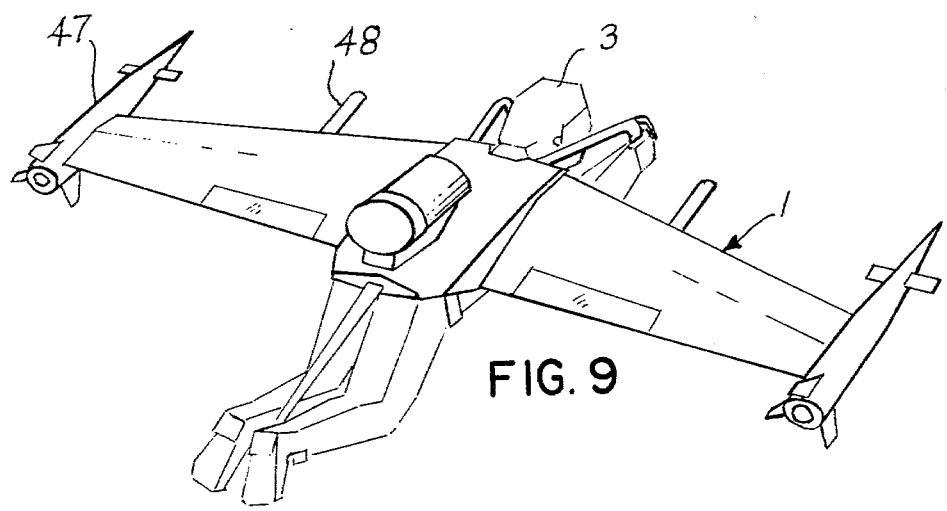

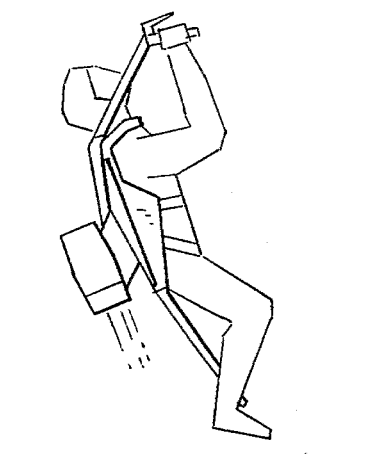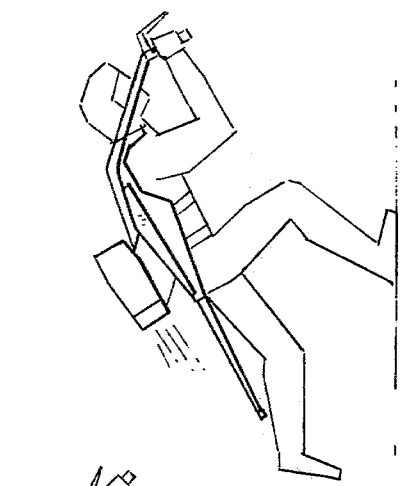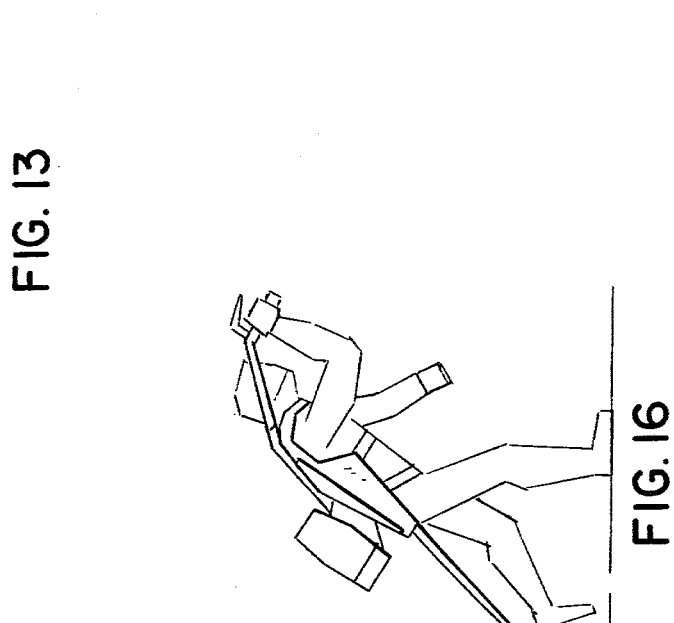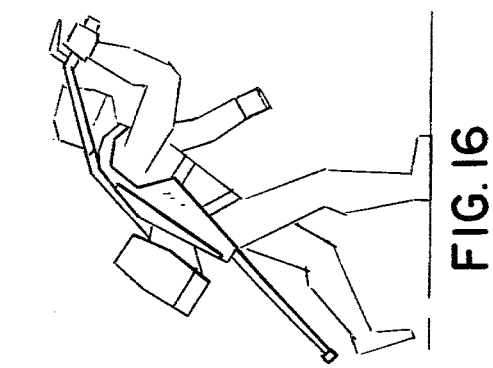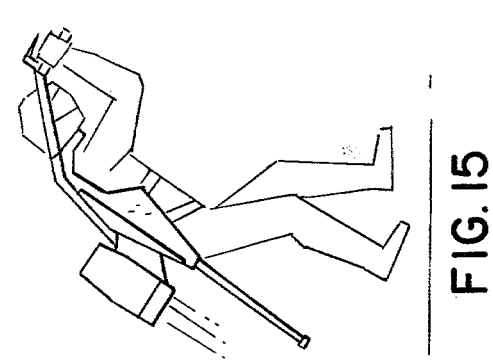
FIG. 13  FIG. 12  FIG. 11  FIG. 10  FIG. 16  FIG. 15  FIG. 14

AIRCRAFT ATTACHABLE TO THE BODY OF A PILOT

BACKGROUND OF THE INVENTION

This invention relates to aircraft of a type that is adapted to be harnessed to the back of a man and propelled in flight by means of an engine.

From ancient times and down through the ages to the present, man has continuously sought to soar like a bird about the sky, to ascend high above the clouds, to glide with the air currents, to swoop down at will toward the earth and turn suddenly in flight to again rise upwardly, and finally to land at will at home or in some far away place.

Man's efforts at solo flight in this manner have met with repeated failure. The contraptions he employed included wings which he endeavored to flap like a bird so as to rise from the ground, or to sustain him in flight after he leaped from some high point. Man's error was in trying to attain flight by flapping the artificial wings which he attached to his body. His body was too heavy, and his physical energy was far too limited for any practical purpose in this respect.

The present invention has been designed to avoid this error. It is directed to the provision of a non-flappable winged craft which is adapted to be attached to the body of a man; it is provided with an engine whereby it may be propelled into space and sustained in flight; and it is provided with manually operable controls whereby it may be directionally controlled in flight and caused to ascend and descend at the will of the pilot.

Accordingly, the subject of this invention comprises a single winged plane having a central portion adapted to be harnessed, as by strapping, to the body of a pilot, and provided with an engine subject to the control of the pilot whereby the plane is adapted to be propelled and sustained in flight. A suitable appendage extending centrally and rearwardly from the plane provides a rest for the pilot's feet while the plane is in flight. Suitable handgrips with associated controls enable the pilot to effect a controlled operation of the engine and directional movements of the plane including takeoff and landing.

The invention further lies in its overall construction, in the general organization of its component parts, and in their cooperative association with one another to effect the various purposes and advantages for which the invention was developed.

The subject of the invention is light in weight and of practical construction. It is suited for use not only for peaceful purposes, but also for warfare. It does not need a large hangar for housing and repairs, since its small size enables its storage in a small shed, garage or in one's home. Nor does it need an airport or acres of land for takeoff and landing; it can take off from, or land upon, a backyard, small lot or roadway.

It is a simply designed, small and inexpensive craft, whereby one may for pleasure or work employ it to rise above the earth, explore the heavens, and travel high over land and water to distant lands and places near; it may be used to considerable advantage in emergencies and rescue operations to swiftly carry a skilled technician, doctor, law enforcement agent, or other to an area of distress, whether it be the top of a mountain or building, a snowbound village, or other inaccessible place. It would be of considerable advantage in warfare, since it may be equipped with cannon, rockets or other firearms and swiftly piloted to a place of need. Its small size and jet developed speed would make it an infinitesimal or phantom target to enemy fire. Its small size and inexpensive structure enable vast numbers of military men to employ them, so as to fill the skies in battle array and sweep over the enemy territory with the utmost of strategic swiftness and surprise.

The foregoing as well as other objects and advantages of this invention will appear more fully hereinafter upon considering the detailed description which follows, together with the accompanying drawings wherein an embodiment of the invention is illustrated. It is to be expressly understood, however, that the drawings are for purposes of illustration and description and are not to be construed as defining the limits of the invention.

BRIEF DESCRIPTION OF THE DRAWING

In the accompanying drawing:

FIG. 5 is a perspective view of the plane, drawn to a slightly larger scale than that depicted in FIG. 1;

FIG. 6 is an enlarged detail section taken on line 6—6 of FIG. 5, showing one of the ailerons and its related control cable;

FIG. 7 is an enlarged detail of one of the swivel handgrips and associated control cables;

FIG. 8 is an enlarged detail of the directional control collar associated with the exhaust tube of the jet engine;

FIG. 9 is a pictorial view of the plane in flight, strapped to the pilot and equipped with cannons and rockets for warfare; and FIGS. 10–16 illustrate in progressive steps a pilot equipped with the plane going through takeoff, flight, and landing actions.

DETAILED DESCRIPTION OF THE INVENTION

Figure 1:
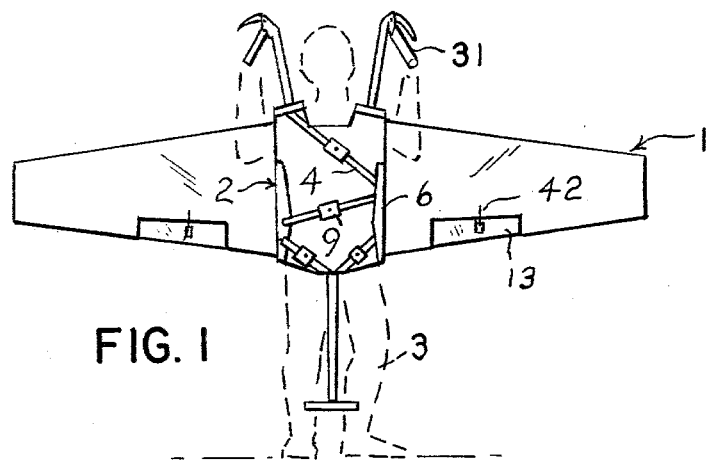
FIG. 1 is a bottom plan view of a single winged plane embodying the invention, the plane is shown strapped to the back of a pilot (depicted in broken line)
Figure 2:
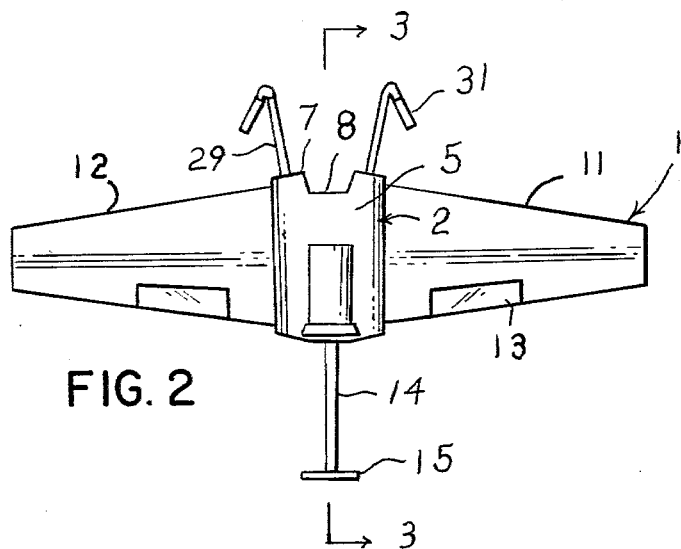
FIG. 2 is a top plan view of the plane.

For a more detailed understanding of the invention reference is now directed to the drawing wherein the invention is illustrated.

The aircraft or plane embodying the invention includes a single wing, generally designated 1, centrally of which is formed a saddle structure 2 adapted to be mounted upon the back of a pilot 3 (broken line) and provided with suitable means such as straps 4 for securing it in place.

The saddle 2 is essentially of an inverted U-form having an upper bridge portion 5 adapted to overlie the back of the pilot, and having a pair of laterally spaced depending side panels 6 adapted to be positioned at opposite sides of the body of the pilot. The forward end of the saddle terminates in a yoke formation having a pair of forwardly and downwardly extending shoulders 7 separated from each other by a space 8. The space is adapted to receive or collar the neck of the pilot; and the shoulder portions 7 are adapted to overlie the shoulders of the pilot.

The straps or belts 4 whereby the plane is attached and secured in a fixed position to the back of the pilot comprises a first strap which is arranged to extend from one of the shoulders 7 diagonally across the pilot's chest to one of the side panels 6; a second strap arranged to extend across the pilot's midrift from one side panel 6 to the other; and a pair of straps extending about the thighs and crotch of the pilot. Suitable means such as buckles 9 are provided, permitting the straps to be drawn taut in tightened relation to the body of the pilot. While further strapping or other suitable means might be utilized for securing the craft and pilot in fixed relation to each other, it is believed that the strapping just described adequately serves the purpose intended.

The saddle section 2 is located centrally of the craft and, accordingly, divides the overall wing 1 into a right wing section 11 and a left wing section 12. Each wing section is equipped with an aileron 13 as an aid, when needed, in obtaining a desired directional movement of the plane in flight, as for example rotation about its longitudinal axis.

Figure 3:
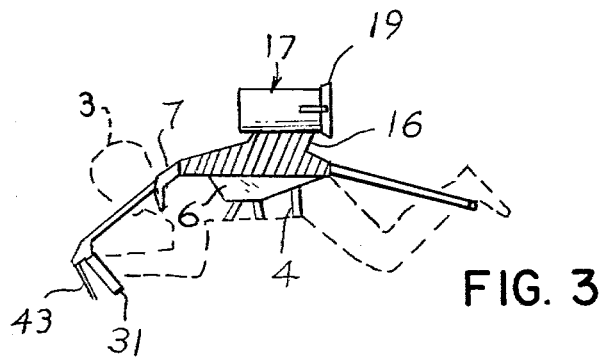
FIG. 3 is a section on line 3—3 of FIG. 2.
Figure 4:
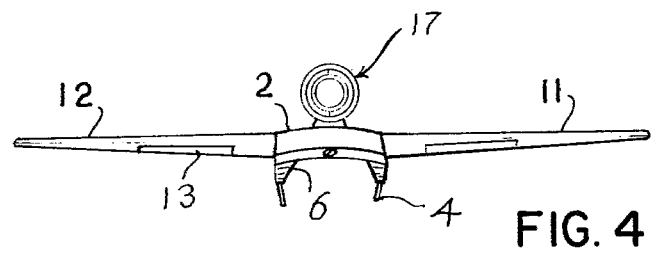
FIG. 4 is a rear elevational view of the plane.

Fixed to and extending rearwardly and angularly downward from the rear end of the saddle is a stick or staff 14 having at its outer end a crosspiece 15. The crosspiece serves as a footrest upon which the pilot may hook or rest his feet when in flight, as indicated in FIG. 3.

The upper part of the saddle provides a pylon or support 16 upon which a jet fuel engine 17 is mounted. Each wing section is fitted internally with a fuel tank 18, one being shown in broken line; and suitable means is provided, not shown, for feeding the fuel from the tanks to and for activating the engine.

Suitable means is provided for effecting directional control of the plane in flight. To this end, a collar 19 is pivotedly associated with the exhaust tube 21 of the engine. The collar is subject to directional control by the pilot, whereby the collar is made cooperable with the exhausting jet gas stream to vary the course of flight as desired by the pilot.

As best seen in FIG. 8, the collar is oval in form with truncated ends, having a slightly smaller inner diameter at its forward end than at its rear end. The forward end of the collar extends over and in surrounding spaced relation to a flared end 24 of the engine's exhaust tube. The collar is journalled at opposite points 25 in a gimbal 26 for pivoting of the collar about a vertical axis. The gimbal in turn is journalled at opposite points 27 in a pair of supporting arms 28 extending from opposite sides of the exhaust tube, so as to permit pivoting of the collar together with the gimbal about a lateral axis.

Extending forwardly from each of the shoulder members 7 of the saddle is an elongated handle 29. Each handle terminates in a handgrip 31 adapted to be held by the pilot while in flight. Each handgrip, as indicated in FIG. 3, depends substantially at right angles from the related handle. Further, as best illustrated in FIG. 7, each handgrip has a swivel connection with its related handle for relative universal movement. To this end, the handgrip is formed with an annular shoulder 33 about its inner end from which axially extends a pin having a ball bearing 34 fixed to its end. The bearing is swivelly engaged in a pocket provided in a nosed end 36 of the related handle. This arrangement allows swivel movement of the handgrip relative to its handle.

Suitable control cables for effecting fueling of the engine and maneuvering of the plane are associated with one or the other of the handgrips. The right handgrip, as appears in FIGS. 7 and 8, is connected to the collar 19 of the engine's exhaust tube by means of a stiff control wire or cable 37 and a pair of such cables 38, one being shown. The cables cause, upon selective directional swivelling of the handgrip, a desired directional pivoting of the collar 19 relative to the exhausting jet stream of the engine which in turn causes the plane to veer in a selected direction.

Control cable 37, which is slidable in a guide sleeve 39, is fixed at one end to the shoulder 33 of the handgrip and is fixed at its other end to an upper surface area of the collar 19. Cable 37 is actuable by the pilot upon his pivoting the handgrip forwardly or rearwardly to cause a corresponding angular pivoting of the collar about its lateral axis points 27 into the path of the exhausting jet stream.

One of the control cables 38, as appears in FIGS. 7 and 8, is fixed at one end to the shoulder 33 of the handgrip and is fixed at its other end to a side surface of the collar 19 and is slidable in a guide sleeve 41. The other control cable 38, not shown, is similarly arranged and disposed with respect to opposite areas of the shoulder 33 and the collar 19. Cables 38 are actuable by the pilot upon his pivoting the handgrip to his right or left. This causes a corresponding pivoting of the collar about its vertical axis points 25 into the path of the exhausting jet stream.

The collar 19 has a normal position, as in FIG. 8, in which its longitudinal axis coincides with that of the jet exhaust tube 21. It can be seen that, accordingly as the handgrip is directionally swivelled, the collar may be pivoted to a selected angular position about its vertical or lateral axis relative to the exhausting jet stream. This causes impingement of the forcefully escaping jet stream against a particular inner area of the collar and consequent rotation of the plane in a desired direction about its vertical or lateral axis. Accordingly, ascent and diving actions of the plane will be controlled by actuation of cable 37; and turning actions of the plane to the right or left will be controlled by actuation of cables 38.

The ailerons 13 are operable to effect rotation of the plane about its longitudinal axis with consequent banking or leveling of the plane. Each aileron is operatively controlled by a separate cable 42, one being shown in FIGS. 7 and 6, connecting the aileron with a separate one of the handgrips. In this respect, the related control cable connects the aileron with a spring loaded lever 43 mounted to the shoulder 33 of the related handgrip. The lever is manually operable by the pilot.

Throttling of the engine is controlled by means of a manipulative sleeve 45 rotatable disposed upon the right handgrip 31 (FIG. 7) and connected by a control cable 46 associated with suitable means, not shown, for feeding fuel to the engine.

Starting of the engine is had by manual actuation of starter associated button means, not shown, located in a suitable area of the plane readily accessible to the pilot.

While one engine has been shown, it is understood that more than one engine may be suitably arranged upon the plane. Also, if desired, a tail assembly may be added to the plane.

As an aid in describing the use of the plane, reference is now directed to the several pictorial FIGS. 10–16, wherein a pilot having the plane strapped to his back illustrates progressively the steps for taking off and landing. The pilot in erect position holds the handgrips, as in FIG. 10, and activates the engine. With the engine operating the pilot then leans and runs forwardly, as in FIGS. 11 and 12. While manipulating the flight controls he obtains a nearly prone position and rises as the thrust of the engine propels him airborne, as in FIGS. 13 and 14. When the pilot desires to land, he suitably activates the flight controls and throttle to progressively reduce the exhaust thrust to bring the plane slowly to the ground in a soft landing, as in FIGS. 15 and 16.

FIG. 9 illustrates how the plane may be equipped for combat action in warfare. It is shown as having rockets 47 and cannon 48 mounted to the wing sections. Suitable controls, not shown, would be provided for effecting selective firing of the rockets and cannon.

While an embodiment of the invention has been illustrated and described in detail, it is to be expressly understood that the invention is not limited thereto. Various changes of form, design or arrangement may be made in its parts without departing from the spirit and scope of the invention. It is my intent, therefore, to claim the invention not only as shown and described but also in all such forms, modifications or equivalents thereof as might reasonably be construed to be within the spirit of the invention when considered in the light of the specification, the drawings, and the appended claims.

What is claimed is:

1. An aircraft attachable to the body of a pilot, comprising a saddle mountable to the back of the pilot; a pair of shoulder elements depending from a forward end of the saddle, one of the elements being adapted to overlie a left shoulder of the pilot and the other element being adapted to overlie a right shoulder of the pilot; a pair of wing sections, one of the sections extending off a left side of the saddle and the other section extending off a right side of the saddle; strap elements carried by the saddle adapted to be engaged about the body of the pilot for securing the saddle to the back of the pilot; a tail stick extending rearwardly from a rear central end of the saddle having a crosspiece at its rear, the tail stick being adapted to be received between the legs of the pilot, and the crosspiece being adapted to serve as a rest for the feet of the pilot; a pair of handles extending forwardly from the saddle terminating in a pair of handgrips manually engageable by the pilot; manipulative control means carried by the handgrips; a separate aileron mounted in each wing section, and a separate aileron actuating control cable associating each aileron with the manipulative control means; a pylon mounted atop the saddle; a jet fuel engine mounted atop the pylon for powering the aircraft in flight; the engine having a rearwardly extending exhaust tube; a flight direction control collar disposed in part about a rear portion of the exhaust tube and projecting in part rearwardly beyond the said rear portion; the collar having a normal position co-axial with a longitudinal axis of the exhaust tube enabling unobstructed escape of exhaust gases from the exhaust tube; means supporting the collar in pivotable relation to the exhaust tube for movement of the collar about a vertical axis relative to the longitudinal axis of the exhaust tube so as to carry an inner area of the collar over a portion of the exhaust end of the exhaust tube; other means supporting the collar in pivotable relation to the exhaust tube for movement of the collar about a lateral axis relative to the longitudinal axis of the exhaust tube so as to carry a further inner area of the collar over a further portion of the exhaust end of the exhaust tube; one of the handgrips having a swiveled mounting on its related handle; and control elements associating the collar with the latter handgrip for effecting selective pivoting of the collar about its vertical or lateral axis.

2. An aircraft attachable to the body of a pilot, comprising a saddle mountable to the back of the pilot; a pair of shoulder elements depending from a forward end of the saddle, one of the elements being adapted to overlie a left shoulder of the pilot and the other element being adapted to overlie a right shoulder of the pilot; a pair of wing sections, one of the sections extending off a left side of the saddle and the other section extending off a right side of the saddle; strap elements carried by the saddle adapted to be engaged about the body of the pilot for securing the saddle to the back of the pilot; a tail stick extending rearwardly from a rear central end of the saddle having a crosspiece at its rear, the tail stick being adapted to be received between the legs of the pilot, and the crosspiece being adapted to serve as a rest for the feet of the pilot; a pair of handles extending forwardly from the saddle terminating in a pair of handgrips manually engageable by the pilot; manipulative control means carried by the handgrips; a separate aileron mounted in each wing section, and a separate aileron actuating control cable associating each aileron with the manipulative control means; a jet fuel engine mounted atop the saddle for powering the aircraft in flight; the engine having a rearwardly extending exhaust tube; flight direction control means associated with the exhaust tube for causing escape of exhaust gases from the exhaust tube in selective directions; and means associating the flight direction control means with one of the handgrips for manipulation by the pilot.

3. An aircraft attachable to the body of a pilot as in claim 2, wherein the saddle is of an inverted U-form having an upper bridge portion adapted to overlie the back of the pilot, and having a pair of laterally spaced depending side panels adapted to be positioned at opposite sides of the body of the pilot.

* * * * *